(12) United States Patent
Espin et al.

(10) Patent No.: US 12,537,347 B2
(45) Date of Patent: Jan. 27, 2026

(54) ELECTRICAL MONITORING DEVICE, IN PARTICULAR FOR A HIGH-VOLTAGE APPLICATION IN A MOTOR VEHICLE

(71) Applicant: MAHLE International GmbH, Stuttgart (DE)

(72) Inventors: Francisco Gonzalez Espin, Elche (ES); Carlos Sevilla Pavon, Elche (ES)

(73) Assignee: Mahle International GmbH (DE)

( * ) Notice: Subject to any disclaimer, the term of this patent is extended or adjusted under 35 U.S.C. 154(b) by 407 days.

(21) Appl. No.: 18/206,612

(22) Filed: Jun. 7, 2023

(65) Prior Publication Data
US 2024/0322501 A1 Sep. 26, 2024

(30) Foreign Application Priority Data
Jun. 7, 2022 (EP) ..................................... 22177440

(51) Int. Cl.
*H01R 13/66* (2006.01)
*H01R 13/53* (2006.01)

(52) U.S. Cl.
CPC ......... *H01R 13/6683* (2013.01); *H01R 13/53* (2013.01); *H01R 2201/26* (2013.01)

(58) Field of Classification Search
CPC ............... H01R 13/53; H01R 13/6683; H01R 2201/26; G01R 31/54
See application file for complete search history.

(56) References Cited

U.S. PATENT DOCUMENTS

| 7,339,465 | B1 | 3/2008 | Cheng | |
| 11,692,502 | B2* | 7/2023 | Ayuzawa | F02P 7/0775 123/406.57 |
| 12,090,934 | B2* | 9/2024 | Hiramatsu | B60R 16/03 |
| 2011/0062798 | A1 | 3/2011 | Tarchinski | |
| 2014/0082418 | A1 | 3/2014 | Kim | |
| 2018/0284179 | A1 | 10/2018 | Hashizume | |
| 2018/0334117 | A1* | 11/2018 | Matsunaga | B60R 16/0207 |
| 2020/0185871 | A1* | 6/2020 | Matsuura | H01R 43/00 |

OTHER PUBLICATIONS

European Search Report for EP-22177440.9, Nov. 9, 2022.

* cited by examiner

*Primary Examiner* — An H Do
(74) *Attorney, Agent, or Firm* — Fishman Stewart PLLC

(57) ABSTRACT

An electrical monitoring device for a high-voltage electrical power supply may include a high-voltage electrical connection unit, a microcontroller, and an electrical connection. The electrical connection unit may include a plug, a plug receptacle, a high-voltage connection electrically connectable to a voltage source, an electrical signal input connection, and an electrical signal output connection. The electrical signal input connection and the electrical signal output connection may be electrically connected when the plug is accommodated in the plug receptacle, and may be electrically separated when the plug is not accommodated in the plug receptacle. The microcontroller may include (i) an electrical signal output electrically connected via a first signal processing unit to the electrical signal input connection and (ii) a signal input electrically connected to the electrical signal output connection. An electrical signal sequence provided at the electrical signal input connection may be transmittable to the microcontroller via the electrical connection.

20 Claims, 1 Drawing Sheet

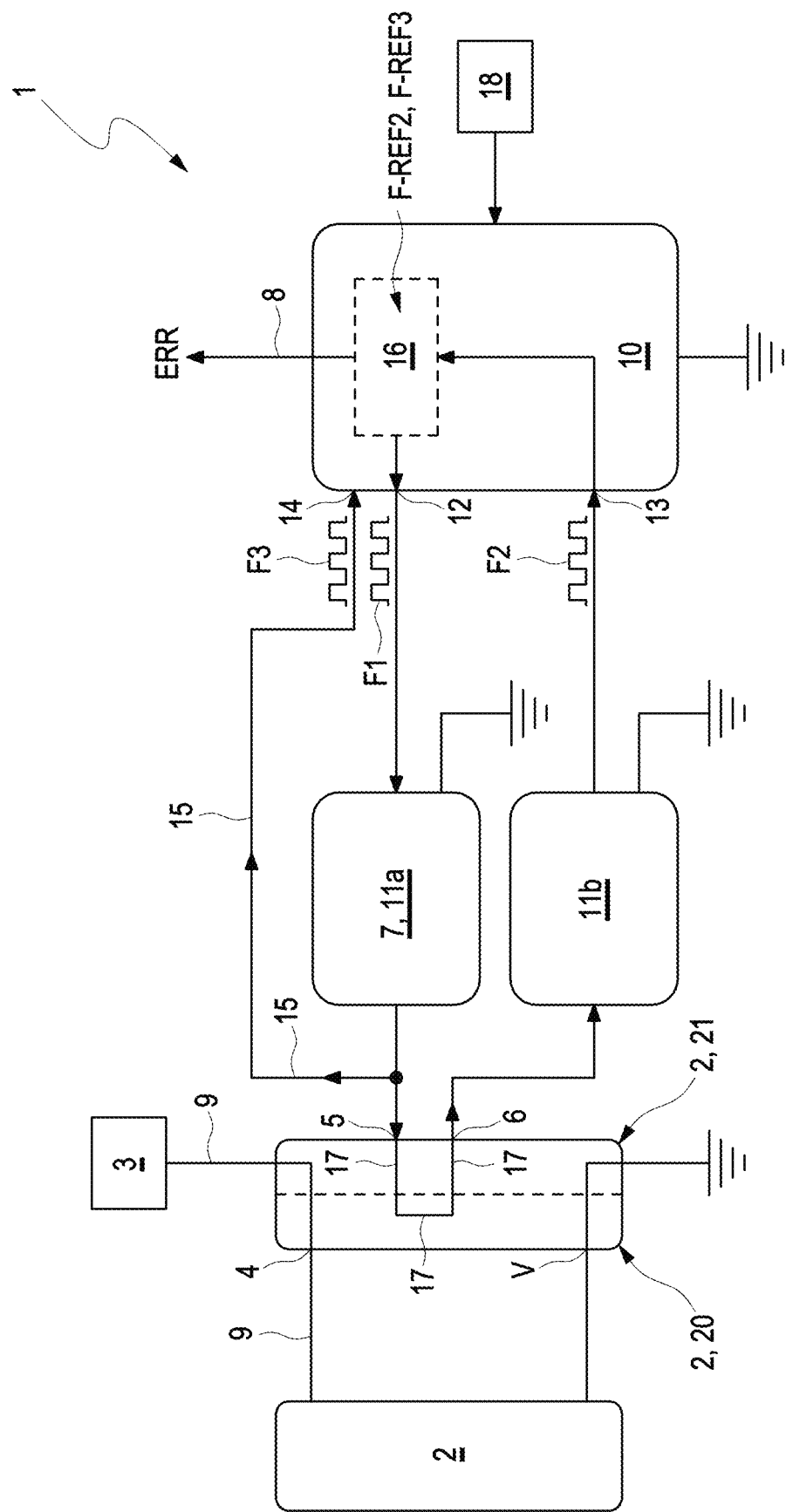

ELECTRICAL MONITORING DEVICE, IN PARTICULAR FOR A HIGH-VOLTAGE APPLICATION IN A MOTOR VEHICLE

CROSS-REFERENCE TO RELATED APPLICATIONS

This application claims priority to European Patent Application No. EP 22177440.9, filed on Jun. 7, 2022, the contents of which is hereby incorporated by reference in its entirety.

TECHNICAL FIELD

The invention relates to an electrical monitoring device, in particular for a high-voltage application in a motor vehicle, and to methods for operating such an electrical monitoring device.

BACKGROUND

In modern electric vehicles, high-voltage electrical voltage sources are increasingly being installed which provide an electrical high voltage, typically of more than 100 volts, in order to effectively supply electrical energy to one or more electrical loads present in the vehicle. When using such high-voltage voltage sources, it must be ensured that no electrical voltages are exposed in two-part electrical connections with plug and plug receptacle.

Therefore, electrical monitoring devices are known which monitor whether or not the plug is accommodated in the plug receptacle in such a two-part electrical connection. In the latter case, the monitoring device can deactivate the high-voltage voltage source for safety reasons.

To monitor the state of the connector and connector receptacle, it is known to equip the monitoring device with a microcontroller that generates a predetermined electrical signal sequence that is transmitted to the high-voltage connection unit and from the latter back to the microcontroller. The high-voltage connection unit is configured in such a way that the electrical signal sequence received by it is only transmitted back to the microcontroller when the plug is received in the plug receptacle.

In this way, the monitoring device can detect whether the plug is located in the plug receptacle or not and, in the latter case, deactivate the electrical voltage source, for example.

Such a conventional monitoring device is known from US 2011/0062798 A1.

However, it is problematic that the monitoring device can also work incorrectly. This applies in particular to the electrical wiring of the monitoring device, by means of which the transmission of the electrical signal sequence detects whether or not the plug is accommodated in the plug receptacle. This means that in the event of a fault condition in the electrical wiring, the monitoring device may erroneously determine that the plug is not located in the plug receptacle, although this is actually the case.

SUMMARY

It is an object of the present invention to provide an improved embodiment for a monitoring device in which the above-mentioned disadvantage is eliminated.

This object is solved by the subject matter of the independent patent claim(s). Preferred embodiments are the subject matter of the dependent patent claim(s).

The basic idea of the present invention is thus to equip such a monitoring device with an additional electrical connection by means of which the microcontroller can check whether or not the electrical signal path from the microcontroller to the high-voltage connection unit is available without error. In this way, a predetermined electrical signal sequence can be used not only to monitor whether the plug and plug receptacle of the high-voltage connection unit are electrically connected to each other. In addition, it can also be determined whether said monitoring of the status of the high-voltage connection unit is also working without errors. In this way, the electrical monitoring device according to the invention can exclude the possibility that an interruption of the electrical connection between the plug and the plug receptacle is assumed, although this is not the case and instead a malfunction of the monitoring device is present. As a result, the operational reliability of the monitoring device is increased.

An electrical monitoring device according to the invention for an electrical high-voltage power supply, preferably in a motor vehicle, particularly preferably in an electric vehicle, comprises an electrical high-voltage connection unit. The electrical high-voltage connection unit has a plug and a plug receptacle in which the plug can be accommodated. For this purpose, the plug can be inserted into the plug receptacle. The high-voltage connection unit comprises a high-voltage connection which can be electrically connected to a high-voltage electrical voltage source. The high-voltage connection can be provided in the plug receptacle. An electrical consumer electrically connected to the plug, for example an electrical energy storage unit or an electrical drive system of the motor vehicle or electric vehicle, can thus be supplied with electrical energy from the high-voltage voltage source when the plug is inserted into the plug receptacle. The high-voltage connection unit can also have an electrical signal input connection and an electrical signal output connection. In this case, the signal input terminal and the signal output terminal are configured in such a way that they are electrically connected to each other when the plug is accommodated in the plug receptacle and are electrically separated from each other when the plug is not accommodated in the plug receptacle. Further, the monitoring device comprises a microcontroller having a signal output electrically connected to the signal input terminal via a first signal processing unit for providing an electrical output signal sequence generated by the microcontroller. Further, the microcontroller has a signal input electrically connected to the signal output, preferably via a second signal processing unit, for processing an electrical signal sequence provided at the signal output. According to the invention, the monitoring device comprises an electrical connection by means of which an electrical signal sequence provided at the signal input can be or is transmitted to the microcontroller.

According to a preferred embodiment, the electrical connection comprises an additional signal input provided at the microcontroller, which is electrically connected to the signal input terminal. From such a safety signal input, the electrical signal sequence originally generated at the signal output of the microcontroller and transmitted to the signal input terminal of the high-voltage connection unit can be transmitted back to the microcontroller, where a comparison can be made with a reference signal sequence stored in the microcontroller. In this way, it can be checked whether the first signal processing unit is working properly or not. A malfunction would result in the electrical signal sequence generated at the signal output not being transmitted in the expected form to the signal input terminal of the high-voltage connection unit and thus back to the additional signal input terminal via the electrical connection. This can be determined by said comparison.

According to a preferred embodiment, the microcontroller comprises an evaluation unit that is set up and configured to compare an electrical signal sequence provided at the signal input terminal and at the additional signal input terminal with a respective reference signal sequence stored in the evaluation unit.

Particularly preferably, the first signal processing unit comprises a transistor circuit by means of which the electrical signal sequence generated at the signal output can be amplified.

The invention further relates to a method for operating the electrical monitoring device according to the invention as described above. The advantages of the monitoring device according to the invention explained above are therefore also transferred to the method according to the invention. According to the method according to the invention, a predetermined electrical signal sequence is generated by the microcontroller at the electrical signal output. Depending on this signal sequence, an electrical signal sequence is provided both at the signal input and at the additional signal input for the microcontroller and compared with a respective reference signal sequence, which can be stored in the microcontroller. A different reference signal sequence can be provided for the comparison with the electrical signal sequence provided at the signal input than for the comparison with the reference signal sequence provided at the additional signal input. In this way, it can be taken into account that the electrical signal sequence present at the signal input connection changes during transmission via the high-voltage connection unit and, in particular, via the second signal transmission device, so that even in nominal, i.e. fault-free, operation of the monitoring device, the electrical signal sequence provided at the signal input is different from that provided at the signal input or at the additional signal input. Based on said comparison, it can be determined whether the high-voltage plug of the high-voltage connection unit is accommodated in or inserted into the plug receptacle and whether the first signal processing unit is operating without error.

According to an advantageous further development of the method, the microcontroller classifies the plug as being accommodated in the plug receptacle and the first signal processing unit as operating without errors if the signal sequences provided to the microcontroller at the signal input and the signal sequences present at the additional signal input correspond in each case to the stored predetermined reference signal sequence. In Addition, or alternatively, in another further embodiment, the microcontroller classifies the first signal processing unit as not operating without errors if the electrical signal sequence provided to or applied to the additional signal input deviates from the predetermined reference signal sequence.

According to a further advantageous further development of the method, the microcontroller classifies the first signal processing unit as not operating without errors independent of whether the connector is accommodated in the connector receptacle if the electrical signal sequence provided or present at the additional signal input does not match the predetermined reference signal sequence.

According to a further advantageous further development of the method, the microcontroller classifies the connector as not being accommodated in the connector receptacle and also classifies the first signal processing as operating without error if the electrical signal sequence provided to the microcontroller at the additional signal input, but not the signal sequence provided to the microcontroller at the signal input, matches the respectively stored predetermined reference signal sequence. Preferably, the predetermined reference signal sequence can be the electrical signal sequence provided at the signal output during nominal, i.e. fault-free, operation of the monitoring device.

Particularly expediently, the electrical signal sequence provided at the signal output can be a periodic electrical signal, in particular a square-wave signal.

Further important features and advantages of the invention will be apparent from the subclaims, from the drawings and from the accompanying FIGURE description based on the drawing.

It is understood that the above-mentioned features and those still to be explained below can be used not only in the combination indicated in each case, but also in other combinations or on their own, without leaving the scope of the present invention.

BRIEF DESCRIPTION OF THE DRAWINGS

Preferred embodiments of the invention are shown in the drawing and will be explained in more detail in the following description, wherein identical reference signs refer to identical or similar or functionally identical components.

The FIGURE illustrates, in schematic form, an example of an electrical monitoring device according to the invention for a high-voltage application in a motor vehicle, in particular in an electric vehicle.

DETAILED DESCRIPTION

The single FIGURE illustrates by way of example and in schematic form an example of an electrical monitoring device 1 according to the invention for a high-voltage application in a motor vehicle, in particular in an electric vehicle. The device 1 comprises a high-voltage electrical connection unit 2, having a plug 20 and a plug receptacle 21 in which the plug 20 can be received. The high-voltage connection unit 2 comprises a high-voltage electrical connection 4, via which the high-voltage connection unit 2 can be connected to an external high-voltage electrical voltage source (not shown).

The high-voltage connection unit 2 is electrically connected to an electrical consumer 3 via an electrical supply line 9 when the plug 20 is inserted into the plug receptacle 21, that is, when the plug 20 is accommodated in the plug receptacle 21, so that, when the plug 20 is inserted into the plug receptacle 21, electrical energy can be transmitted from a voltage source (not shown) to the electrical consumer via the high-voltage connection unit 2 and the supply line 9 to the electrical consumer 3. The electrical consumer 3 can, for example, be an electrical drive system of the motor vehicle or electric vehicle.

The high-voltage connection unit 2 further comprises an electrical signal input terminal 5 and an electrical signal output terminal 6. The signal input terminal 5 and the signal output terminal 6 are configured such that, when the plug 20 is received in the plug receptacle 21, they are electrically connected to each other via an electrical connection line 17 extending partly in the plug 20 and partly in the plug receptacle 21, and when the plug 20 is not received in the plug receptacle 21, they are electrically separated from each other.

Further, the monitoring device 1 comprises a microcontroller 10. Electrical power can be provided to the microcontroller 10 by means of a low voltage source 18. The microcontroller 10 has a signal output 12 electrically connected to the signal input terminal 5 via a first signal processing unit 11a for providing an electric signal sequence F1 generated by the microcontroller 10. The first signal processing unit 11a may comprise a transistor circuit 7 (not shown in detail) by means of which the electrical signal sequence F1 generated at the signal output 12 may be amplified.

Furthermore, the microcontroller 10 comprises a signal input 13 electrically connected to the signal output terminal 6 via a second signal processing unit 11b for processing an electrical signal sequence F2 provided at the signal output terminal 6.

Furthermore, the device 1 comprises an electrical connection 15 by means of which an electrical signal sequence provided at the signal input terminal 5 can be transmitted to the microcontroller 10.

This electrical connection 15 comprises an additional signal input 14 provided at the microcontroller 10, which is electrically connected to the signal input terminal 5. Furthermore, the microcontroller 10 comprises an evaluation unit 16 which is arranged and configured to compare an electrical signal sequence F2, F3 provided at the signal input 13 and at the additional signal input 14 with a respective reference signal sequence F-REF2, F-REF3 stored in the evaluation unit 16.

In the example, the device 1 is electrically connected to an external high-voltage source (not shown) for generating and providing an electrical high voltage V in the connector 20. By means of the microcontroller 10 it can be monitored if connector 20 is plugged in the receptable so that the high-voltage-source is electrically connected to the electrical connection unit 2.

In the following, the method according to the invention for operating the of the device 1 is explained by way of example. Accordingly, a predetermined electrical signal sequence F1 is generated by the microcontroller 10 at the electrical signal output 12. This electrical signal sequence F1 provided at the signal output 12 can, for example, be a periodic signal, in particular a square-wave signal.

The signal sequence F1 is processed in the first signal processing unit 11a and then transmitted to the signal input connector 5. When the connector 20 is accommodated in the connector receptacle 21, the electrical signal sequence is transmitted to the signal output terminal 6 due to the electrical connection line 17 between the signal input terminal 5 and the signal output terminal 6 at that very time.

Via the signal output terminal 6, the electrical signal sequence is then passed to the signal input 13 of the microcontroller 10 via the second signal processing unit 11b during nominal operation, that is, in particular, when the first signal processing unit 11a is functioning without error, and is provided there as an electrical signal sequence F2.

Since the signal sequence on the signal path from the signal output 12 of the microcontroller 10 to the signal input 13 can change—in particular due to the signal processing in the two signal processing units 11a, 11b—the generated signal sequence F2 provided at the signal input 13 can in principle—even in nominal operation—be different from the signal sequence F1 generated at the signal output 12.

According to the FIGURE, the electrical signal sequence present at the signal input terminal 5 is provided to the microcontroller 10 at the additional signal input 14 via the electrical connection 15. Again, the signal sequence can change on the signal path from the signal output 12 of the microcontroller 10 to the additional signal input 14—in particular due to the signal processing in the first signal processing unit 11a—so that the electrical signal sequence F3 provided at the additional signal input 14 can also be different in principle-even in nominal operation—from the signal sequence F1 generated at the signal output 12.

If the first signal processing unit 10a operates without error and the connector 20 is accommodated in the connector receptacle 21, then in the example of the FIGURE the electrical signal sequence F1 provided at the signal output 12 is transmitted via the first signal processing unit 11a, the high-voltage connection unit 2, and the second signal processing unit 11b to the signal input 13 and there an electrical signal sequence F2 is provided to the microcontroller 10 for evaluation which corresponds to the stored reference signal sequence F-REF2. Similarly, the electrical signal sequence F1 provided at the signal output 12 is provided via the first signal processing unit 11a and the electrical connection 15 as an electrical signal sequence F3 at the additional signal input 14, which corresponds to the reference signal sequence F-REF3.

Therefore, in the method according to the invention, the evaluation unit 16 of the microcontroller 10 compares the electrical signal sequence F2 provided at the signal input 13 with the reference signal sequence F-REF2 stored in the evaluation unit 16 of the microcontroller 10. In addition, the evaluation unit 16 compares the electrical signal sequence F3 provided at the additional signal input 14 with a reference signal sequence F-REF3 stored in the evaluation unit 16 of the microcontroller 10. The evaluation unit 16 of the microcontroller 10 now classifies the connector 20 as being accommodated in the connector receptacle 21 and also classifies the first signal processing unit 11a as operating without errors if the electrical signal sequences F2, F3 provided to or applied to the microcontroller 10 at the signal input 13 and at the additional signal input 14 correspond to the respective reference signal sequences F-REF2, F-REF3 stored in the microcontroller 10.

In the event that the first signal processing unit 11a operates without error but the connector 20 is not accommodated in the connector receptacle 21, the electrical signal sequence F2 provided at the signal input 13 deviates from the assigned reference signal sequence F-REF2, whereas the electrical signal sequence F3 provided at the additional signal input 14 matches the assigned reference signal sequence F-REF3. In this case, as a result of the comparison, the evaluation unit 16 of the microcontroller 10 classifies the connector 20 as not being inserted into the connector receptacle 21 and thus not being received therein, but classifies the first signal processing unit 11a as operating without error.

Furthermore, the microcontroller 10 classifies the first signal processing unit 11a as not operating without errors, independent of whether the connector 20 is accommodated in the connector receptacle 21 or not, if the electrical signal sequence F3 provided or present at the additional signal input 14 does not match the predetermined reference signal sequence F-REF3.

In the case where the first signal processing unit 11a is not operating error-free, but an error condition exists, the electrical signal sequence F3 provided at the additional signal input 14 deviates from the associated reference signal sequence F-REF3. In other words, the comparison performed by the evaluation unit 16 shows that the signal sequence F3 is different from the reference signal sequence F-REF3. In this case, as a result of the comparison, the evaluation unit 16 of the microcontroller 10 classifies the transmission device 1 as operating incorrectly.

In a further development of the example, it may be provided that the microcontroller 10 generates an error signal ERR provided at an electrical error signal line 8. The error signal line 8 can be part of a CAN or LIN communication network. The error signal ERR can be transmitted to a vehicle (not shown) comprising the high-voltage source for further processing by means of the communication network. For example, a control unit (not shown) of the vehicle can deactivate the high-voltage source when receiving the error signal ERR from the microcontroller 10.

In this way, it is prevented that the high voltage generated by the high voltage power source is exposed unnoticed at the high voltage connection unit 2 or its plug receptacle 21.

The invention claimed is:

1. An electrical monitoring device for a high-voltage electrical power supply, the device comprising:
   a high-voltage electrical connection unit including:
   a plug;
   a plug receptacle in which the plug is receivable;
   a high-voltage connection that is at least one of electrically connectable and electrically connected to a high-voltage electrical voltage source;
   an electrical signal input connection; and
   an electrical signal output connection, the electrical signal input connection and the electrical signal output connection electrically connected to one another when the plug is accommodated in the plug receptacle, the electrical signal input connection and the electrical signal output connection electrically separated from one another when the plug is not accommodated in the plug receptacle;
   a microcontroller including:
   an electrical signal output electrically connected via a first signal processing unit to the electrical signal input connection for providing a first electrical signal sequence provided via the microcontroller; and
   a signal input electrically connected to the electrical signal output connection for processing a second electrical signal sequence provided at the electrical signal output connection; and
   an electrical connection via which a third electrical signal sequence provided at the electrical signal input connection is transmittable to the microcontroller.

2. The monitoring device according to claim 1, wherein:
   the electrical connection includes an additional signal input disposed on the microcontroller; and
   the additional signal input is electrically connected to the electrical signal input connection.

3. The monitoring device according to claim 2, wherein the microcontroller further includes an evaluation unit configured to compare the second electrical signal sequence provided at the signal input and the third electrical signal sequence provided at the additional signal input with a corresponding reference signal sequence stored in the evaluation unit.

4. A method of operating the electrical monitoring device according to claim 2, the method comprising:
   generating the predetermined first electrical signal sequence with the microcontroller at the electrical signal output;
   generating the second electrical signal sequence and the third electrical signal sequence dependent on the first electrical signal sequence provided at the electrical signal output;
   providing the second electrical signal sequence and the third electrical signal sequence at the signal input and at the additional signal input, respectively; and
   comparing the second electrical signal sequence and the third electrical signal sequence with a corresponding predetermined reference signal sequence.

5. The method according to claim 4, further comprising classifying, via the microcontroller, the plug as being received in the plug receptacle and the first signal processing unit as operating without errors if the second electrical signal sequences provided to the microcontroller at the signal input and the third electrical signal sequences applied to the additional signal input match the corresponding predetermined reference signal sequence provided by the microcontroller.

6. The method according to claim 4, further comprising classifying, via the microcontroller, the first signal processing unit as not operating without errors independent of whether the plug is accommodated in the plug receptacle if the third electrical signal sequence provided at the additional signal input does not match the corresponding predetermined reference signal sequence.

7. The method according to claim 4, further comprising classifying, via the microcontroller, the plug as not being accommodated in the plug receptacle and the first signal processing unit as operating without errors if the third electrical signal sequence provided at the additional signal input matches the corresponding predetermined reference signal sequence and the second electrical signal sequence provided at the signal input does not match the corresponding predetermined reference signal sequence.

8. The method according to claim 4, wherein the first electrical signal sequence provided at the electrical signal output is a periodic signal.

9. The method according to claim 8, wherein the first electrical signal sequence provided at the electrical signal output is a square-wave signal.

10. The monitoring device according to claim 1, wherein the first signal processing unit includes a transistor circuit via which the first electrical signal sequence provided at the electrical signal output is amplifiable.

11. The monitoring device according to claim 1, wherein the first electrical signal sequence is a periodic signal.

12. The monitoring device according to claim 11, wherein the first electrical signal sequence is a square-wave signal.

13. The monitoring device according to claim 1, further comprising a second signal processing unit electrically connecting the signal input to the electrical signal output connection.

14. An electrical monitoring device for a high-voltage electrical power supply, the device comprising:
   a high-voltage electrical connection unit including:
   a plug;
   a plug receptacle in which the plug is receivable;
   a high-voltage connection that is electrically connectable to a high-voltage electrical voltage source;
   an electrical signal input connection; and
   an electrical signal output connection, the electrical signal input connection and the electrical signal output connection electrically connected to one another when the plug is accommodated in the plug receptacle, the electrical signal input connection and the electrical signal output connection electrically separated from one another when the plug is not accommodated in the plug receptacle;
   a microcontroller including:
   an electrical signal output for providing a first electrical signal sequence, the electrical signal output electrically connected to the electrical signal input connection via a first signal processing unit;

a signal input for receiving a second electrical signal sequence, the signal input electrically connected to the electrical signal output connection via a second signal processing unit; and an additional signal input for receiving a third electrical signal sequence provided to the electrical signal input connection, the additional signal input electrically connected to the electrical signal input connection.

15. The monitoring device according to claim 14, wherein the first signal processing unit includes a transistor circuit via which the first electrical signal sequence is amplifiable.

16. The monitoring device according to claim 14, wherein the microcontroller further includes an evaluation unit configured to compare the second electrical signal sequence and the third electrical signal sequence with a corresponding reference signal sequence stored in the evaluation unit.

17. The monitoring device according to claim 16, wherein, when the second electrical signal sequence and the third electrical signal sequence each match the corresponding reference signal sequence, the microcontroller determines that the plug is received in the plug receptacle and the first signal processing unit operated without errors.

18. The monitoring device according to claim 16, wherein, when the third electrical signal sequence does not match the corresponding reference signal sequence, the microcontroller determines that the first signal processing unit operated with errors.

19. The monitoring device according to claim 16, wherein, when the second electrical signal sequence does not match the corresponding reference signal sequence and the third electrical signal sequence matches the corresponding reference signal sequence, the microcontroller determines that that the plug is not accommodated in the plug receptacle and the first signal processing unit operated without errors.

20. The monitoring device according to claim 16, wherein the microcontroller determines that:

the plug is received in the plug receptacle and the first signal processing unit operated without errors when the second electrical signal sequence and the third electrical signal sequence each match the corresponding reference signal sequence;

the first signal processing unit operated with errors when the third electrical signal sequence does not match the corresponding reference signal sequence; and the plug is not accommodated in the plug receptacle and the first signal processing unit operated without errors when the second electrical signal sequence does not match the corresponding reference signal sequence and the third electrical signal sequence matches the corresponding reference signal sequence.

\* \* \* \* \*